Jan. 31, 1961  W. BRODBECK  2,969,716
PROFILE-MILLING AND ENGRAVING MACHINE
Filed Sept. 4, 1958  6 Sheets-Sheet 2

INVENTOR.
Willy Brodbeck
BY
Munn, Liddy, Daniels & March
ATTORNEYS

Jan. 31, 1961 W. BRODBECK 2,969,716
PROFILE-MILLING AND ENGRAVING MACHINE
Filed Sept. 4, 1958 6 Sheets-Sheet 3

INVENTOR.
Willy Brodbeck
BY
Munn, Liddy, Daniels & March
ATTORNEYS

United States Patent Office 2,969,716
Patented Jan. 31, 1961

2,969,716

PROFILE-MILLING AND ENGRAVING MACHINE

Willy Brodbeck, Calmbach (Enz), Germany, assignor to Alfred Gauthier G.m.b.H., Calmbach (Enz), Germany, a corporation of Germany Filed Sept. 4, 1958, Ser. No. 759,039

Claims priority, application Germany Sept. 7, 1957

13 Claims. (Cl. 90—13)

This invention relates to profile-milling and/or engraving machines which operate in accordance with the well-known system of rectangular or linear coordinates involving three-directional or -dimensional movements between the workpiece and the tool.

Machines of the above type, wherein the control program for performing operations on workpieces is effected through the medium of elongate or rectilinear cams, are well-known. Such machines have an advantage over machines utilizing other types of control cams, in that the manufacture of the elongate or rectilinear cams and the setting up of the control program utilizing such cams may be easily done in a manner readily understood. The effecting of the desired control program from such cams is accomplished through the use of tracing arms which are arcuately movable in fixed bearings and adapted to engage the cams. The traversal of such cams by the arcuately movable tracing arms is effected by longitudinally shifting the cams past the arms. While this prior arrangement has been found to operate satisfactorily, it had a major drawback in that it required a considerable amount of space. Moreover, while such arcuately movable tracing arms involved less expensive bearings which also could be accommodated in a smaller space, the arrangement still had the disadvantage as the steps or different levels of the control cams became greater in depth or height, there was not possible a true response and movement of the tracing arms to the steps or slopes of the cam. This was particularly disadvantageous in the machining of workpieces where the operation involved cooperation between several such control cams.

One object of the present invention is to provide a novel and improved profile-milling and/or engraving machine operating according to the principle of rectangular coordinates, which machine is extremely compact in its construction and utilizes available space to the fullest advantage, thereby to reduce the overall size of the equipment. A further object of the invention is to provide an improved automatic machine as above characterized, wherein the control cams which establish the control program may be easily produced with little trouble and expense, and wherein the setting up or establishment of the control program may be easily effected. A still further object of the invention is to provide an improved automatic machine in accordance with the foregoing, wherein simple and reliably operative transmission means are provided between the programming cam devices and the support means on which the workpieces and tools are mounted, such transmission means being further readily adaptable for changing or varying the extent of movement of the said support means with respect to the cam devices. Yet another object of the invention is to provide an improved automatic machine as above set forth, having a plurality of programming cam devices, wherein a simple yet effective and reliable synchronization of the several control values of the cam devices is at all times insured.

The above objects are accomplished, according to the present invention by the provision of a novel organization which includes control cams of elongate or rectilinear construction for effecting the control program. Each one of such cams is carried by a movable support which is mounted in such a manner that the cams are bodily, reversibly movable laterally of their length. That is, considering the cams as being generated with respect to a straight longitudinal line to which the various steps and slopes are referred, said line being common to such steps and slopes, the reversible movement of each cam would be at right angles to the said straight line. In conjunction with such cams there are provided cooperable stops, also termed herein "unyielding cam followers," which are shiftable longitudinally of and along the cams so as to traverse the same while in engagement therewith. The said cam followers are carried by guides which extend in directions parallel to the hypothetical straight lines forming the bases of the cams, and the latter are continually spring-urged into engagement with the said followers. I further provide novel transmission means or devices adapted to be actuated by the movable cam supports as the cams are bodily shifted back and forth during their traversal by the unyielding cam followers, said transmission devices in turn causing movements of the support means for the workpieces and the tools.

By the above organization there is provided, in accordance with the invention, an especially advantageous, profile-milling and/or engraving machine which operates on the principle of rectangular coordinates. Such machine is characterized by a desirable compactness effecting an appreciable saving of available space, this being obtained by virtue of the arrangement of the stops or cam followers which are shiftable longitudinally of the cams to traverse the same. The elongate cams and the elongate cam followers guide means may be disposed in a parallel arrangement closely spaced to each other, and with such organization the greatest dimension of the space required would be only that corresponding to a single length of one cam. By such organization there is the further advantage that the control program as effected by the cams may be set up or calculated in a simple and easily understood manner, and that the control cams which effect the control program may be easily fabricated without complicated computations or the like. Such result is obtained by virtue of the fact that the entire control program is effected through the use of elongate cams which are constructed on a rectilinear basis. Moreover, a further advantage results from the arrangement where the movable cam supports can shift in directions at right angles to the straight lines forming the bases of the cams, in that the extent of movement of such supports is always accurately proportional to the different heights or steps provided on the control cams. Thus, and insured, there is made possible an uncomplicated transmission of the control values or step heights to the tool and workpiece support means of the machine. Additionally where a number of control cams are employed a precise and accurate control is obtainable by virtue of the lateral movements of the cams and movable cam supports being at all times faithful duplications of the cam contours.

Preferably the movable supports which carry the elongate or rectilinear cams include turnable spindles which are disposed parallel to each other and to the straight lines forming the bases of the cams. By this organization there is achieved a mounting having the minimum amount of friction, and one which may be constructed at relatively low cost. Also, such spindle-type mounting means provides for great flexibility in determining the extent of movement which is to be delivered by the movable supports for the cams.

In addition, such organization enables the movable supports to be readily adapted to particular types of motion transmission means by which the tool and workpiece support devices are actuated to effect the various required operations on the workpieces.

Moreover, by the above arrangement where the control cams, the supports therefor, and the guides which carry the cam followers are arranged in parallel relation to each other, the entire assemblage may be disposed vertically in the lower, upright portion of the machine frame or housing whereby the horizontal space required is relatively small. In consequence, the dimensions of the base of the machine may be kept small, thereby resulting in a considerable saving of floor space.

With the above organization wherein the elongate control cams, the elongate movable supports therefor, and the elongate guides for the cam followers or tracing members are disposed all in parallel relation to each other it is possible to readily effect a control of the tool and workpiece supporting means in accordance with the three rectilinear coordinates of a spatial coordinate system, by mounting the cam followers or tracing members on a single, vertically shiftable support piece. This provides a number of advantages; for one thing it reduces considerably the number of components which are required, and it is further saving of space. At the same time, it provides for great reliability of operation.

Moreover, the movements of the cam followers or tracing members may be advantageously effected by a positive drive employing a gear rack, and a simple driving device may be provided on the mounting for the cam followers, for engagement with the said rack to effect the traversing movement of said followers or tracing members. This arrangement not only provides for reliable operation, but also enables a high degree of accuracy to be obtained in the cooperable relationship between the cams and followers. Other advantages include simplicity, reduction in the number of components, and a further saving of space.

With the above organization the supporting means which mounts the cam followers may be advantageously constituted as a gear housing having a gear train arranged within it, said gear train meshing with the rack to effect the traversing movement of the cam followers. The gear train may include a driving portion which is shiftable along and splined to a driving shaft disposed in parallelism with the said rack. With such construction a desirable compactness is obtainable, together with accurate guiding of the cam followers or tracing members and flexibility as regards the structure and arrangement of the driving means which effects the traversal of the cams by the cam followers.

Where the three cam followers are carried by a single mounting means they may be advantageously positioned so as to be related to each other by 90° angles; for example by being disposed in a 180° arc about a common center. With such arrangement, the driving shaft along which the driving portion of the gear train is shiftable, may be disposed in the remainder of the said arc about the common center. The base of the machine may comprise an upright structure of polygonal cross section having a plurality of corners, and the spindles which are included in the movable supports carrying the rectilinear cams may be advantageously arranged in upright positions, within the corners of the said machine base. This results in an advantageous utilization of space within the machine housing, and enables the base of the machine to have relatively small dimensions. Also, it results in a practical and accessible arrangement of the components which are involved.

Further, in accordance with the invention, in conjunction with the above-described movable supports which carry the rectilinear cams it is possible to utilize motion transmission devices having adjustable or settable means by which different ratios of movement may be readily effected. Thus, the extent of movement of the tool and workpiece supporting means may be varied or changed at will, without requiring a change in the depth or height of the steps or slopes of the rectilinear cams, and without involving any change in the extent of movement of the movable supports which carry the said cams. The setting of such adjustment devices, moreover, many be carried out in a simple manner, and accordingly the machine tool may have a much wider field of application than was heretofore possible.

A particularly simple and economical construction is had when the transmission devices are constituted as levers connected with the movable supports for the cams, said levers cooperating with the tool and workpiece supporting means to effect actuation thereof. With such arrangement it is a simple matter to provide for a change in the ratio of movement through the use of transmission parts disposed on or at the lever arms and constituted so as to be shiftable with respect to said arms.

Where the tool or workpiece support means which is to be actuated has a path of movement which is parallel to the axis of the spindle included in the movable support of the associated control cam, the said transmission part arranged at the lever arm may be advantageously constituted as a slide adapted to be actuated by the lever arm and to be movable in a plane at right angles to the axis of the said turning spindle. Such slide may carry a cam part which is adjustable or tiltable by a suitable adjustment device, said cam part thus cooperating with the support means for the tool or workpiece. With this organization an appreciable mechanical advantage is obtainable, whereby the tool or workpiece may be shifted by minute amounts in response to much greater movement of the cam and movable support therefor. Also, such construction involves relatively few, simple components, and is positive and accurate in its operation.

The required movements of the tool and workpiece support means may be obtained in response to relatively small forces provided by the control cams and movable supports therefor when antifriction bearing means are provided between the tool and workpiece supporting means and the frame of the machine. Such anti-friction bearings may be of the roller or needle type, which are preferably adjustable to take up excessive play. With such organization the wear on the control cams may be greatly reduced, especially when the control cams are biased into engagement with the cam followers by resilient means such as springs or the like.

The accompanying drawings illustrate embodiments of the invention.

Fig. 3 shows a plurality of programming cams and associated follower devices, whereas Fig. 2 illustrates a single programming cam and cam follower device.

Figure 1:
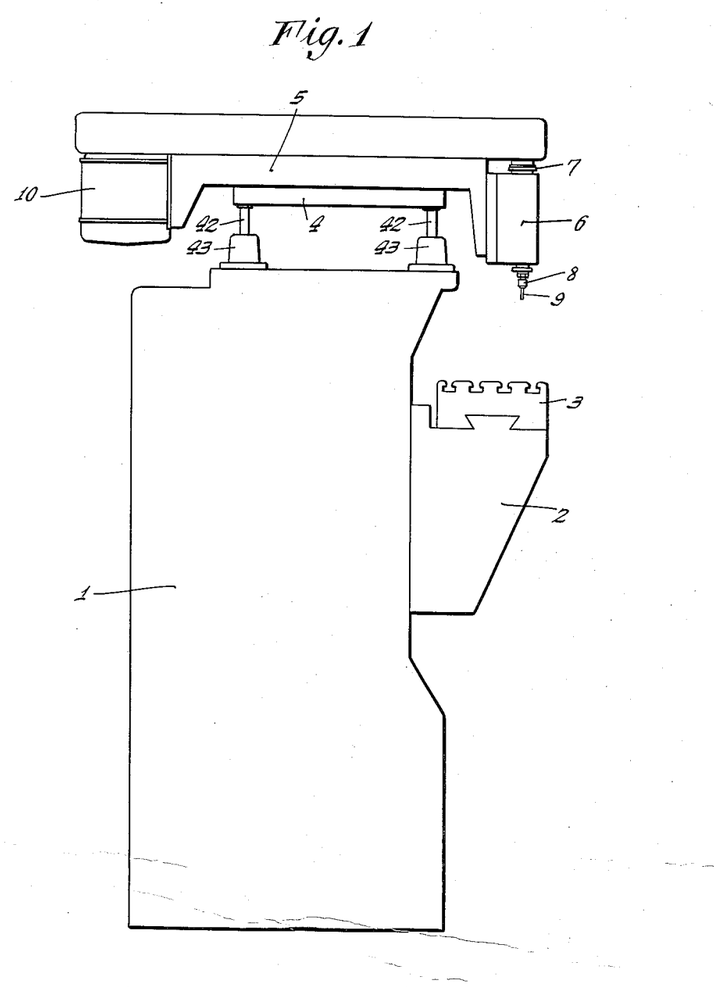
Figure 1 is a schematic side elevational view of a profile milling and engraving machine adapted to operate in accordance with the rectangular coordinate principle. The tool and workpiece supporting means are clearly seen in this figure.

Referring to Fig. 1, the housing of the present improved profile milling and engraving machine is indicated by the numeral 1. At the front of the housing 1 there is provided a usual work-supporting arm or part 2 which carries a work-supporting table 3 constituted as a slide, said slide being movable in reverse directions along a path of travel at right angles to the plane of the sheet. On the upper portion of the housing 1 there is provided a vertically shiftable supporting member or part 4, carried by guide rods or posts 42 which are vertically slideable in bearing bushings 43. The vertically movable support part 4 carries a tool support 5 which is constituted as a slide longitudinally movable to the left and to the right as viewed in Fig. 1, the path of movement of the slide 5 being perpendicular to the path of movement of the slide or table 3. The tool support 5 carries a tool spindle 7 which is rotatably mounted in a bearing and guide part 6. The tool spindle 7 has a chuck 8, adapted to carry a cutter or other tool 9. The spindle 7 is driven by an electric motor 10 in the well-known manner, said motor being also carried by the tool slide 5.

The horizontal shifting movement of the worktable or slide 3 in directions at right angles to the paper, and the horizontal and vertical shifting movements of the tool slide support 5 and support part 4 provide for relative three directional movement corresponding to the axes X, Y, and Z of a spatial rectangular coordinate system.

In accordance with the present invention, a control programming means is provided for actuating the worktable 3 and the tool slide 5, said means being characterized by elongate control cams of rectilinear nature. Each one of the said control cams is carried by a separate support which is movable in reverse directions, said directions being substantially at right angles to the basic or reference lines of the cams. That is, as already explained above, the elongate cams may be laid out with their steps or slopes referred to a straight base line, and by the invention the supports which carry the cams are then reversibly movable in directions substantially perpendicular to the said straight base lines of the cams. Also, each of the cams and its movable support is spring-biased to cause the cam to continually engage a stop or unyielding cam follower, said follower being movable longitudinally of the cam on an elongate guide which extends in a direction subtantially parallel with the straight base line of the cam. With such organization, as the stops or cam followers are shifted therefor are given lateral movements as determined by the cam configurations, and such movements may be utilized through the medium of mechanical, electrical or hydraulic transmission devices to effect actuation of the worktable 3 and the tool supporting slide 5, together with the support part 4 therefor.

In the illustrated embodiments of the invention the movable supports for the control or programming cams include turning spindles which are arranged with their axes parallel to each other and to the straight line bases of the respective control cams. This organization of laterally movable elongate supports and turning spindles for the control cams has a special advantage in that the bearings therefor may be easily and economically fabricated with great accuracy and with a minimum of friction. Moreover, by an organization as provided herein where the elongate movable supports for the cams are laterally arcuately shifted as determined by the cam contours, the extent of movement which need be imparted to the cam supports by the cams is not critical but instead quite flexible, and thus with different kinds of motion transmission devices actuated by such movements a reliable control and high degree of accuracy is insured.

Instead of being turnably or arcuately shiftable, the movable supports for the control cams could have a different movement, as for example a translational movement, as by mounting such supports in straight guides. Such arrangement would also enable the objectives of the invention to be carried out. However, the use of straight guides and translational movement of the control cam supports does not have the advantages obtained with movable supports involving turnable spindles as illustrated in the embodiments of the invention.

Figure 4:
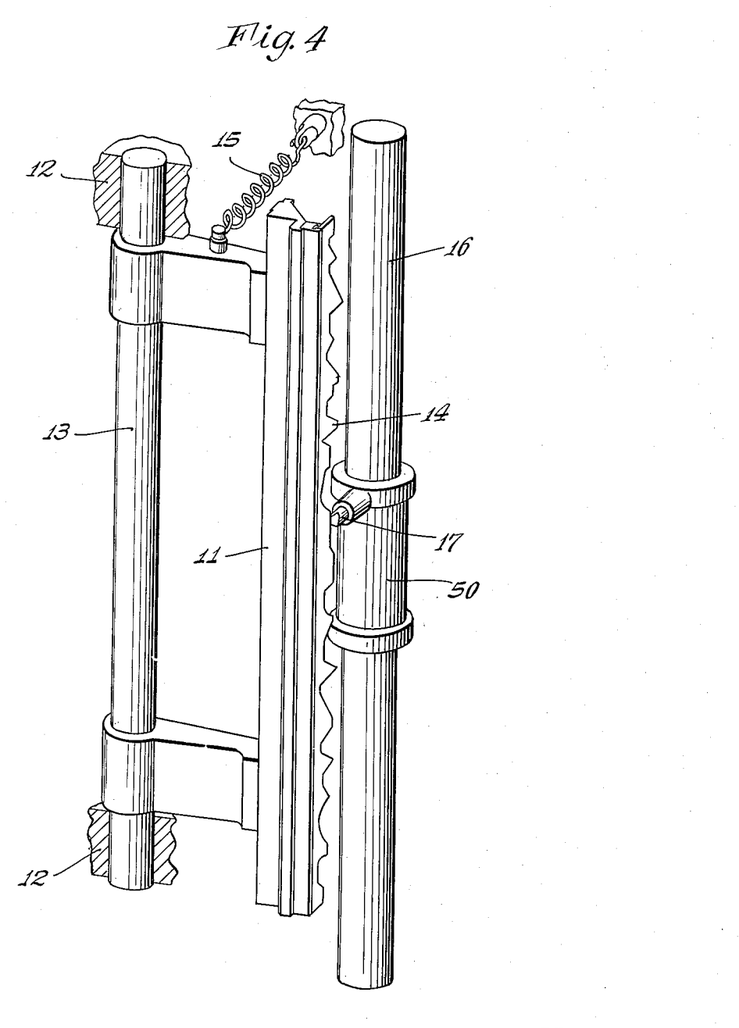
Fig. 4 is a fragmentary perspective view showing an arrangement of programming cam and cam follower device as provided by the invention.

Referring to the schematic showing of Fig. 4 the turnable spindle type of movable cam support may be readily understood. In this figure a movable cam support is indicated at 11, said support being carried by upper and lower arms which are rigidly secured to a turnable spindle 13 mounted in fixed bearings 12. The cam support 11 carries a programming control cam 14 which is rigidly attached or secured to the support. A biasing spring 15 is provided, which continually urges the elongate cam 14 into engagement with a stop or unyielding cam follower 17, which latter is fixedly carried by a sleeve-like support 50. The sleeve 50 is longitudinally slidable on a guide post 16 which extends in a direction parallel to the spindle 13 and to the straight line forming the basis of the control cam 14.

A consideration of Fig. 4 will reveal how the control program which is represented by the profile on the cam 14 may be easily set up or established, and how it is possible by simple operations to produce the cam 14. For example, in forming the cam 14 a pencil or equivalent layout may first be made of the desired profile. Such layout may be on paper, on the cam itself or on a template. Thereafter, the said layout is reproduced on the metal strip which is to be the cam, by simple operations such as sawing, filing or the like. Where it is desired that the extent of turning of the spindle 13 be exactly proportional to the profile of the cam 14, that is, to the steps or slopes of the cam, the latter may be bent or made curved, so as to have a center of curvature coinciding with the axis of the spindle 13. With such organization, even a great extent of travel or movement of the cam 14 and support 11 therefor in a lateral direction, i.e. about the axis of the spindle 13, will result in exactly proportional turning movements of the said spindle. Where however the depressions or raised portions of the cam 14 are not of great depth or height, the cam may be constituted of a flat strip of metal without introducing appreciable error by virtue of the turning movement of the spindle 13 being not precisely proportional to the lateral movement of the cam.

Figure 2:
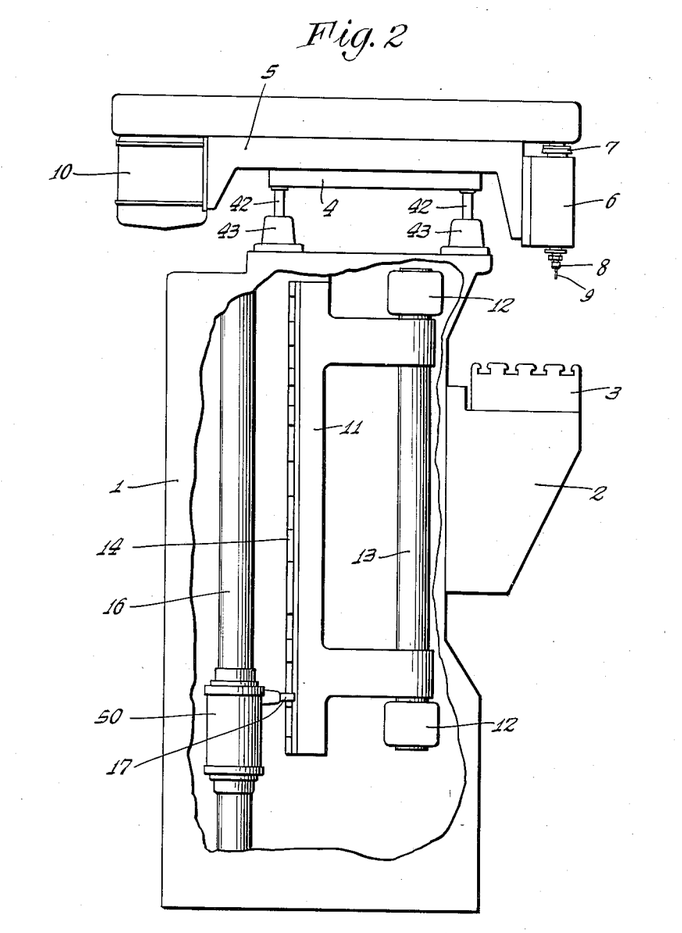
Fig. 2 is a view similar to that of Fig. 1 with a side wall of the machine housing broken away to show interior details relating to the cam control or programming mechanism.

In Figure 2 there is illustrated an especially advantageous arrangement for the movable supports which mount the control cams, and for the guide which mounts the cam followers or tracing members. In this figure the said movable support 11 and the guide 16 together with the turnable spindle 13 are arranged in parallel relation and disposed vertically within the housing 1 of the machine. Thus, relatively little space in a horizontal direction is needed, in consequence of which the base of the machine may have relatively small dimensions. Therefore there is a distinct saving of floor space effected. For reasons of clarity of illustration there is shown in Figure 2 only one support 11 and one cam 14, together with a single cam follower 17 shiftable along the single guide post 16. It will be understood, however, that additional cam supports 11, spindles 13 and cam followers 17 may be provided, maintaining a similar vertical parallel disposition of the components whereby a maximum saving of space in a horizontal direction is obtained. The schematic representation in Fig. 2 is similar to the schematic representation of Fig. 4, and accordingly similar components have been given the same reference numbers. For the sake of clarity of illustration the showing of the cam 14 and cam follower 17 in Fig. 2 is somewhat different from that of Fig. 4; however, the principle of operation is exactly the same, the cam follower being shiftable along the guide 16 in a vertical direction so as to traverse the cam 14 and cause the latter and support 11 to shift laterally in accordance with the profile provided on the cam.

Figure 3:
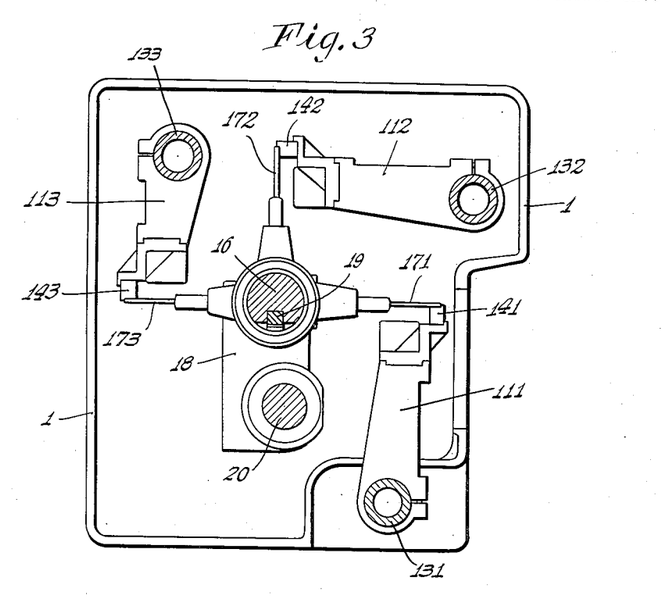
Fig. 3 is a horizontal sectional view of an automatic milling machine constructed in accordance with the invention, the section being taken through the machine housing at a point below the workpiece and tool support means. The machine housing shown in Fig. 3 may be similar to the housings of Figs. 1 and 2. However.

A simple and readily adjustable shifting movement or actuation of the tool and workpiece supports 5 and 3 respectively is obtained by utilizing three of the cams 14 and three of the followers 17 respectively associated with the cams, each cam and its follower effecting an actuation of the tool or workpiece in a direction corresponding to a separate rectangular coordinate of the spatial coordinate system. Such organization involving the use of three control or programming cams is illustrated in Fig. 3, wherein cams 141, 142 and 143 are indicated, said cams being similar generally to the cam 14 shown in Figs. 2 and 4. The supports for the cams 141, 142 and 143 are labeled 111, 112 and 113, and the respective turning spindles included in such supports are indicated by the reference numerals 131, 132 and 133.

Figure 5:
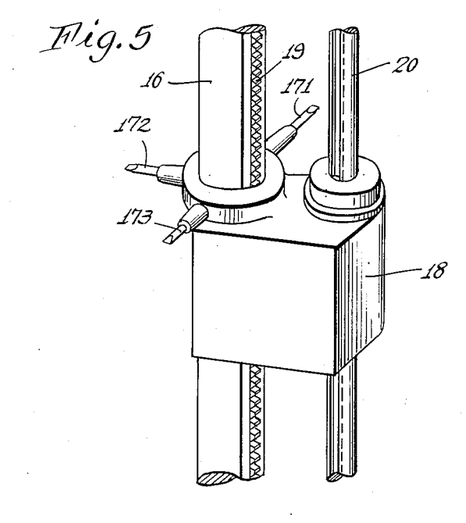
Fig. 5 is a fragmentary perspective view of three cam followers or tracing members carried by a single mounting and actuated by a single drive means, as provided by the invention.
Figures 6, 8, 9:
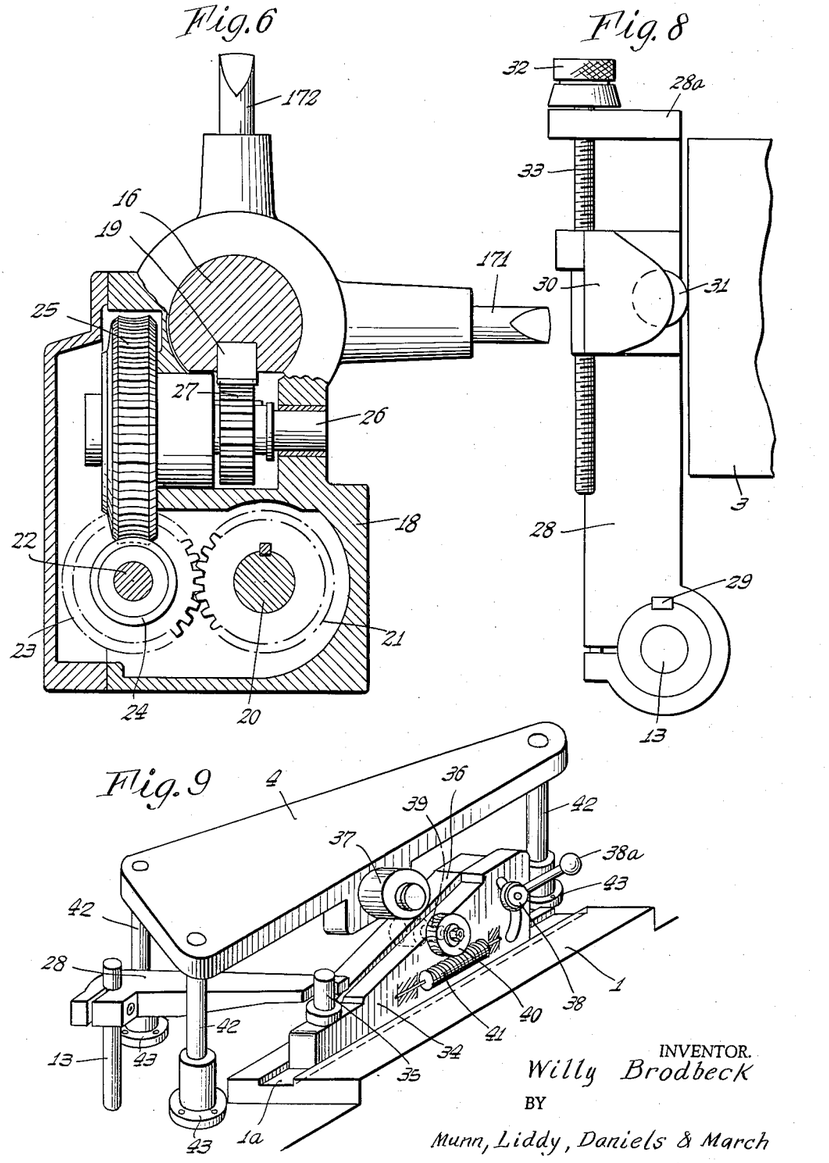
Fig. 6 is a fragmentary horizontal sectional view through the drive means for the cam follower device illustrated in Fig. 5, a portion of the cam followers being shown in top plan view.
Fig. 8 is a bottom plan view of one of the motion transmitting or transmission devices illustrated in Fig. 7.
Fig. 9 is a perspective view of another one of the variable motion transmitting or transmission devices as illustrated in Fig. 7.

It has been already mentioned above that the cam supports including the turning spindles thereof are shifted proportionally with the lateral shifting movements of the cams as effected by the profiles of the latter. With the organization shown in Fig. 3 an accurate and reliable synchronization may be effected between the movable supports of the various cams and the cam followers for such cams. In accomplishing such simple and effective synchronization, the cam followers which are adapted to traverse the cams are all carried by a single, common support. This is illustrated in Figs. 3, 5 and 6 wherein the cam followers or tracing members 171, 172 and 173 are cooperable respectively with the cams 141, 142 and 143, said followers being rigidly attached to a single common support piece 18. By this organization a great deal of space may be saved, and duplication of components avoided. This is because but a single support is now provided for the cam followers or tracing members instead of three separate supports, and the same is true of the guide means for such support and the drive mechanisms by which the cam followers are made to traverse the cams. As shown herein, but a single support 18 and a single guide post 16 need be provided, together with a single driving device for actuating the support 18. Moreover, by such organization an unvarying common mounting and drive is effected for the cam followers which influences favorably the cooperable relationsip between such followers and the individual cams, thereby effecting a high accuracy in the functioning of the machine. As shown, the single or common support piece 18 is carried by the single guide post 16, the latter being provided with a single driving rack 19. By means of a simple drive device which will be described in detail below and which is connected with the single support piece 18 the latter will be readily shifted along the rack 19 and the guide post 16.

With such an organization of guiding and driving means for the stops or cam followers 171, 172 and 173 there is the advantage that the shifting or traversing movement of the cam followers is determined exclusively by the drive device associated with the guide post 16 and common support 18, since the reactions of the movements of the cams and the movable cam supports to the feed of the cam followers are eliminated. Thus, there is insured a high accuracy in the cooperable relationships between the cams and cam followers.

In the embodiment of the invention illustrated in Figs. 3, 5 and 6 the common support piece 18 is constituted as a gear housing. In the interior of the housing 18 a gear train is provided, which is engaged with the rack 19 and is also connected with a drive shaft 20 passing through the housing 18 and arranged to be parallel with the guide post 16. As may be seen in Fig. 6, the gear train comprises a gear 21 which is splined to the shaft 20 so as to turn simultaneously therewith, said gear 21 however being shiftable longitudinally along the shaft 20 since it is loosely carried thereon. The gear 21 meshes with another gear 23 which is carried by a fixed spindle 22 within the gear housing 18. Rigid with the gear 23 is a worm 24 which meshes with a worm wheel 25 carried by a shaft 26 and driving a gear 27 meshing with the rack 19. It will be understood that the spindle 26 is at right angles to the spindle 22, as shown.

The driving device as illustrated in Fig. 6 is of special advantage due to its compact construction whereby it occupies little space. By arranging the drive shaft 20 so as to be parallel with the rack 19 and guide post 16 there is further obtained a more accurate guiding of the gear housing 18 and consequently of the cam followers 171, 172, and 173. Also, by such organization greater freedom is had in arranging the source of power for the shaft 20, to effect the traversing movement of the gear housing 18 and cam followers. For example, an electric motor which is arranged in the machine for any other purpose may be utilized to drive the shaft 20 and thus effect the traversing movement of the cam followers or stops 171, 172, and 173.

As shown in Fig. 3 an advantageous disposition of the cam followers or stops 171, 172 and 173, the drive shaft 20, and the turning spindles 131, 132 and 133 is effected, which is especially saving of space while at the same time providing a desirable accessibility of the various components. As shown, the three cam followers are carried by the common supporting piece 18 so as to be related to each other by angles of 90 degrees. The said cam followers are disposed about the common axis or guide post 16 in a 180 degree arc, and the drive shaft 20 is disposed in an adjoining arc about the said guide post 16. Moreover, the housing 1 of the machine comprises an upright structure of polygonal cross section having a plurality of corners, and the turnable spindles 131, 132 and 133 are disposed in three of the corners of the upright structure of the housing 1.

The above arrangement of the control elements and components of the programming mechanism provides for easy accessibility and conforms with good manufacturing practices, while at the same time making the best possible use of the available space. This latter advantage is of particular importance in those cases where relatively little floor space is available.

With profile milling and engraving machines it is often desired to mill or engrave the same shape or the same design in different sizes. With a machine constructed in accordance with the present invention this may be advantageously accomplished by means of an easy setting operation or adjustment, and with relatively little expense. In effecting this, the motion transmission devices which transmit the movements of the movable cam supports to the workpiece and tool slides include adjustable means by which different ratios of movement may be obtained, and thus different degrees of movement of the tool and workpiece slides may be had with the same extent of movement of the movable supports for the programming cams. With such organization the extent of movement imparted to the tool and workpiece slides may be easily changed at will.

Figure 7:
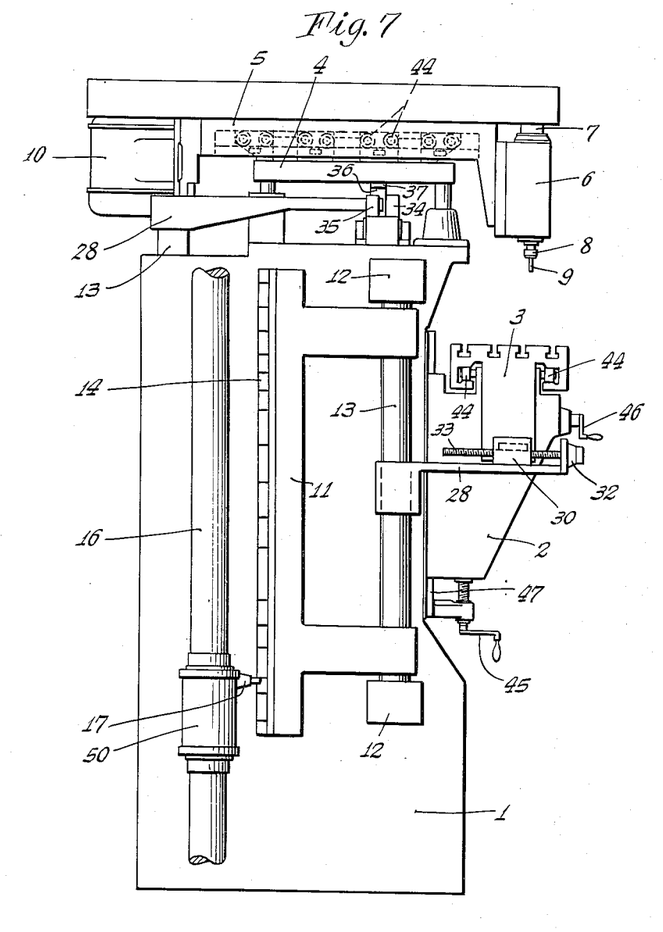
Fig. 7 is a side elevational view of a profile milling and engraving machine constructed in accordance with the invention. This view is similar to the views of Figs. 1 and 2, but reveals additional details of the transmission devices incorporated in the programming mechanism. The showing of this figure is schematic in some respects, for purposes of clarity of illustration.

The embodiments of the invention shown in Figs. 7 and 9 illustrate such variable transmission devices of the mechanical type. One such variable transmission device is illustrated separately in Fig. 8, and shown in Figure 7 in conjunction with the other parts of the automatic milling machine. This device comprises a lever 28 which may be rigidly mounted on the turning spindle 13 of a movable support for a programming cam. Such mounting, for example, may be accomplished by use of a spline 29 as shown. The lever 28 is adapted to cooperate with a support means or slide for a tool or workpiece. As illustrated, it cooperates with the slide or worktable 3, and for the this purpose it carries a part 30 which is shiftable and adjustable on the lever 28. The part 30 is shown as having a roller 31 which is engageable with the end face of the slide 3. Under the action of spring power (not shown) the slide 3 is maintained in engagement with the roller 31. To effect a relative shifting or adjustment of the part 30 on the lever 28 there is provided a threaded spindle 33 adapted to be actuated by a turnable knob 32. The spindle 33 has a bearing in an arm 28a of the lever 28, and has threaded engagement with the adjustable part 30. Thus, the adjustment or shifting of the part 30 on the lever 28 shortens or lengthens the effective length of the lever arm, so that with a given fixed extent of movement of the turning spindle 13 the amount of movement which is imparted to the workpiece slide 3 may be varied or changed.

By the foregoing arrangement which may be utilized with different types of motion transmission devices arranged between the programming cam support and the tool or workpiece support means, the transmission of movement from the cam carriers to the tool and workpiece support means may be effected in an extremely simple and economical manner, as well as effecting changes in the ratio of the movements. Such simplicity and economy results from the fact that the movement transmission device and adjustment device are constituted as a single unit and comprise only two relatively simple parts, that is, a lever and a slide adjustably carried by the lever. By shifting the said slide, which may be easily done, a stepless, simple and positive setting or change of the movements of the tool and workpiece support means is obtained.

The above-described adjustable transmission device has proved to be particularly advantageous where tool or workpiece sildes are to be shifted in directions extending at right angles to the axis of the turning spindle for the movable cam supports. In Figure 9 there is illustrated an advantageous organization and construction of variable transmission device where the tool or workpiece supporting slide is shiftable in a direction which is parallel to the axis of the turning spindle of the movable support for the programming cam. The variable transmission device illustrated in Fig. 9 comprises a slide 34 which is translationally movable in a guide 1a. The guide 1a extends in a direction which is perpendicular to the turning spindle 13 of the movable support for the programming cam, and is shown as carried at the upper portion of the machine housing 1. The slide 34 has an upstanding pin or roller 35 adapted to engage the free end of a transmission lever 28 which is rigidly carried on the turning spindle 13. The slide 34 may be spring urged by means (not shown) to maintain such engagement between the pin or roller 35 and the lever arm 28. Adjustably carried by the slide 34 is a tiltable cam member 36 which may have fixedly attached to it a bearing stud or peg 39 passing through and turnable in the slide 34. By such pivotal mounting it will be understood that the cam member 36 may be tilted with respect to the slide 34. The support part 4 which is vertically movable by virtue of being mounted on the vertical posts 42 is provided with a roller 37 adapted to engage the camming surface or edge of the cam part 36. Locking of the cam part 36 in any adjusted, tilted position may be effected by means of well known locking devices, as for example the clamping device 38 having an actuating lever 38a. By means of such clamping device, the cam member 36 may be secure-ly immovably clamped to the slide 34. In order to set or adjust the cam part 36 in different tilted positions on the slide 34, the free end of the bearing stud or peg 39 is provided with a worm wheel 40 which meshes with a worm 41 rotatably carried by the slide 34. The worm 41 may be directly or indirectly connected with any suitable manually operable knob, as for example a knob similar to that shown at 32 in Fig. 8.

It will now be understood that turning of the spindle 13 and swinging of the lever 28 will effect a shifting of the slide 34 whereby the camming member 36 carried thereby operates, through engagement with the roller 37 on the support part 4, to raise or lower the said part. Or, if the camming member 36 is made to extend perfectly horizontally, no raising or lowering movement of the support part 4 will be effected when the turning spindle 13 is turned.

A variable transmission device as above constituted has the advantage that a positive and stepless transmission of movement may be effected to the support part 4 over a wide range, in an extremely simple manner; moreover, by suitable adjustment of the cam member 36 extremely minute movements of the part 4 may be effected, or no movement may be effected even though the spindle 13 and arm 28 turn through a relatively wide arc.

As above described, the workpiece slide 3 may be shifted in response to turning movement of one of the turning spindles 13, and the support part 4 and slide 5 which carry the tool spindle 7 may be vertically shifted in response to turning movement of another of the turning spindles 13. The third or remaining spindle 13 may effect a translational movement of the slide 5 on the support part 4 in a manner similar to that by which translational movement of the workpiece slide 3 is effected, using the lever 28 and adjustably mounted piece 30 thereon as already described above and illustrated in Figs. 7 and 8. In order to avoid needless duplication of description and illustration, details of such third transmission device are not given here since they are exactly similar to those already described.

Referring again to Fig. 7 the tool supporting slide 5 as well as the workpiece supporting slide 3 may be advantageously carried on their supporting parts by means of antifriction bearings. Such bearings for example may be of the well known roller or needle bearing type, and are indicated by the reference numerals 44 in this figure. To obtain a high accuracy with respect to the guiding of the workpiece and tool supports 3 and 5, the said antifriction bearings may be of the adjustable type, to limit the free play or looseness thereof in the well known manner.

By the provision of the antifriction bearing means for supporting the tool and workpiece slide 5 and 3 respectively there is the advantage that such slide may be easily moved or actuated; thus, only relatively small shifting forces are required to effect such actuation. With this organization, where a spring or biasing means is provided, such as the spring 15 shown in Fig. 4, connected to the movable supports for the control cams relatively little force need be exerted on the control cams by the cam followers to effect the said actuation of the tool and workpiece slides, and accordingly wear of the cam profiles is greatly lessened and a long life expectancy of the programming cams is had.

For the purpose of initially properly positioning the workpieces which are to be machined by the cutting tool, the workpiece support or slide 3 may be vertically and horizontally shiftable by hand. This may be accomplished in the well known manner by means of threaded spindles which may be actuated by hand cranks, such as the cranks 45 and 46 shown in Fig. 7. Changes in the height of the workpiece support 3 are therefore effected by changing the height of the supporting part 2, which for this purpose is carried by a suitable vertical guide 47 mounted on the machine housing 1.

The operation of the improved automatic milling and/or engraving machine as provided in accordance with the invention is as follows:

After effecting the initial or basic settings of the machine, as by the hand adjustments just described the only further operations that are required comprise locating the workpieces on a holding device or nest which is arranged on the workpiece slide 3, and removing the workpieces from the said holding device after the machining operations have been performed on them. To start the cycle of operation, both the drive motor 10 for the cutter 9 and the drive motor which turns the drive shaft 20 to cause traversing movement of the cam followers 171, 172 and 173 are started. This may be advantageously done by use of a single electric switch. Upon such switch being closed, the support piece constituted by the gear housing 18 and the cam followers 171, 172 and 173 carried thereby are shifted along the rack 19 and guide post 16, thereby to cause the cam followers to traverse the cams 141, 142 and 143. The cam followers thus trace the profiles of the programming cams, and in so doing they effect shifting movements of the movable cam supports 111, 112 and 113 together with the turning spindles 131, 132, and 133. Such shifting movements, which in extent are proportional to the individual heights of the steps or lands of the programming cams, are now transmitted to the tool and workpiece support means or slides by the levers 28 and parts 30, or levers 28 and parts 34, 36. In accordance with such movements, the desired profile millings or engravings are performed on the workpieces by the rotating cutter 9.

After the cam followers have traversed the programming cams, the motors for the cutter or tool 9 and for the drive shaft 20 are automatically halted. This may be done in any well-known manner, as by the actuation of a stop switch when the common support piece 18 reaches the end of its movement. Thereafter, the completely machined workpiece may be removed from the machine.

Instead of only one tool or cutter 9, as shown in the embodiments of the invention, several similar tools may be provided on the tool support slide, for simultaneous and equal machining of several workpieces. Thus the advantages of the machine as provided by the invention may be still further extended.

In the illustrated embodiments of the invention the machine which is shown operates on a rectangular, spatial coordinate system. However, operations may be effected on workpieces according to other coordinate systems in a like manner, as for example the system which uses polar coordinates. Regardless of the coordinate system which is utilized, in any circumstance, many advantages may be had by use of the machine as provided by the invention, as described in detail above.

Variations and modifications may be made within the scope of the claims, and portions of the improvement may be used without others.

I claim:

1. An automatic milling machine of the type having a control program, comprising a housing; workpiece support means on said housing, for mounting a workpiece thereon; tool support means on said housing, for mounting a tool thereon in cooperable relation to the workpiece support means, said support means having relative multi-directional movements with respect to each other; a plurality of elongate control cams representing said control program; movable supports respectively carrying said cams and movable on said housing, said cams being bodily reversibly movable substantially in directions at right angles to their basic reference lines; unyielding cam tracing members engaged with said cams; spring means normally holding said cams in engagement with the tracing members; guide means mounting said tracing members for movement in paths substantially at right angles to the directions of movement of the associated cams, thereby to enable relative traversing movements of the cams and associated tracing members to take place; means connecting said tracing members for simultaneous movement; a transmission actuated by one movable cam support for effecting relative movement between the workpiece and tool support means in one direction as determined by the associated tracing member; and an additional transmission actuated by another movable cam support for effecting relative movement between the workpiece and tool support means in another direction as determined by the tracing member associated with the cam of said other support, the said two relative movements between the workpiece and tool support means being coordinated by virtue of the simultaneous movements of the tracing members as effected by the said connecting means.

2. The invention as defined in claim 1, in which the said movable supports for the cams are arcuately shiftable and in which there are spindles, one for each support and carrying the same, each spindle being arranged with its axis substantially perpendicular to the direction of action of the associated cam.

3. The invention as defined in claim 1, in which the housing of the machine has an upright supporting portion, and in which the movable supports which carry the cams and the guide means which mount the cam followers are elongate and extend vertically in the said housing portion.

4. The invention as defined in claim 1, in which the said support means includes a movable mounting structure by which the tool and workpiece support means may have relative movement in another predetermined direction different from the said previously-mentioned directions whereby the tool and workpiece mounting means together define a spatial coordinate system of three coordinates, in which there are three control cams, three movable supports for said cams respectively, and three cam followers engaged respectively with said cams, in which there is a third transmission means actuated by a third movable cam support for effecting relative movement between the workpiece and tool support means in still another direction as determined by the associated tracing member, and in which the guide means mounting the said tracing members for movement comprises a structure which is common to all three of said tracing members, and in which the connecting means connects all three members for simultaneous movement.

5. The invention as defined in claim 1, in which there is a drive means for shifting the tracing members along the said guide means, said drive means including a rack and a gear drive device engaged with said rack and operable to shift the tracing members along the said guide means.

6. The invention as defined in claim 5, in which the drive means includes a gear housing, in which the gear drive device includes a gear train disposed in said housing, in which there is a drive shaft disposed parallel to said rack, and in which the gear drive device includes a drive part shiftable along the drive shaft and splined thereto to turn simultaneously therewith.

7. The invention as defined in claim 4, in which the unyielding tracing members act on the cams in directions which are related to each other by angles of 90 degrees, said tracing members being disposed in a 180 degree arc about a common center, in which the said drive shaft is disposed in an adjoining arc about the said common center, in which the said machine housing has an upright supporting portion of polygonal cross section provided with a plurality of corners, and in which the movable supports for the cams include upright spindles disposed within the corners of the said housing portion.

8. The invention as defined in claim 1, in which the said transmission means comprise mechanical drives having driving and driven parts so arranged that the transmission ratio of the drives may be varied, whereby for a given movement of the movable cam supports the extent of movement of the tool and workpiece support means may be changed within limits.

9. The invention as defined in claim 8, in which the mechanical drives include driving levers which are connected respectively with the movable supports carrying the cams, and include driven parts, said driven parts being cooperable with the workpiece and tool support means and adjustment of said driven parts with respect to the levers changing the said transmission ratio of the mechanical drives.

10. The invention as defined in claim 9, in which a driven part cooperable with a support means comprises a slide actuated by one of the said levers and comprises a cam member adjustably carried by said slide and tiltable with respect thereto, said cam member being engageable with the support means, and in which there is a locking device for securing the cam member in different adjusted positions on the said slide.

11. The invention as defined in claim 1, in which there are anti-friction bearings included in the said tool and workpiece support means, said anti-friction bearings being adjustable to limit the free play thereof.

12. The invention as defined in claim 9, in which a driven part cooperable with a support means comprises a roller adjustably mounted on a lever.

13. An automatic milling machine of the type having a control program, comprising a housing; workpiece support means and tool support means; means mounting said workpiece support means and tool support means on the housing for relative movement; an elongate control cam representing the said control program; a movable support carrying said cam and movable on the housing, said cam being bodily reversibly movable substantially in directions at right angles to its basic reference line; an unyielding tracing member engaged with said cam; spring means normally holding said cam in engagement with the said tracing member; guide means mounting said tracing member for movement in a path substantially at right angles to the direction of movement of the said cam, thereby to enable relative traversing movement of the cam and tracing member to take place; and transmission means connected to and actuated by the said movable cam support, for effecting relative movements between the workpiece support means and tool support means in response to different positionings of the cam carried by said movable cam support as determined by the said unyielding tracing member.

References Cited in the file of this patent

UNITED STATES PATENTS

| 2,239,413 | Dewey | Apr. 22, 1941 |
| 2,726,578 | Creek | Dec. 13, 1955 |

FOREIGN PATENTS

| 965,092 | France | Feb. 8, 1950 |